(12) United States Patent
Stephenson

(10) Patent No.: US 6,385,581 B1
(45) Date of Patent: May 7, 2002

(54) SYSTEM AND METHOD OF PROVIDING EMOTIVE BACKGROUND SOUND TO TEXT

(76) Inventor: Stanley W. Stephenson, 9 Town Pump Cir., Spencerport, NY (US) 14559

(*) Notice: Subject to any disclaimer, the term of this patent is extended or adjusted under 35 U.S.C. 154(b) by 0 days.

(21) Appl. No.: 09/459,190

(22) Filed: Dec. 10, 1999

Related U.S. Application Data

(60) Provisional application No. 60/132,572, filed on May 5, 1999.

(51) Int. Cl.[7] ............................................. G10L 21/00
(52) U.S. Cl. ....................... 704/270; 704/275; 704/258
(58) Field of Search ................................. 704/251, 258, 704/260, 270, 275, 278; 434/178, 170, 307, 169, 317

(56) References Cited

U.S. PATENT DOCUMENTS

| | | | |
|---|---|---|---|
| 3,704,345 A | 11/1972 | Coker et al. .................... 179/1 |
| 3,724,100 A | 4/1973 | Surel ........................... 434/312 |
| 4,124,943 A | 11/1978 | Mitchell et al. ......... 434/307 R |
| 4,201,105 A | 5/1980 | Alles ............................. 84/606 |
| RE30,666 E | 7/1981 | Mitchell et al. ......... 434/307 R |
| 4,337,375 A | 6/1982 | Freeman ...................... 704/260 |
| 4,375,058 A | 2/1983 | Bouma et al. ......... 340/146.3 Z |
| 4,406,626 A | 9/1983 | Anderson et al. ........... 434/169 |
| 4,429,182 A | 1/1984 | Masuzawa et al. ......... 704/270 |
| 4,459,114 A * | 7/1984 | Barwick ...................... 434/307 |
| 4,527,274 A | 7/1985 | Gaynor ....................... 704/267 |
| 4,542,524 A | 9/1985 | Laine ............................ 381/53 |
| 4,655,713 A | 4/1987 | Weiss .......................... 434/178 |
| 4,695,962 A | 9/1987 | Goudie ........................ 704/267 |
| 4,700,322 A | 10/1987 | Benbassat et al. ........... 704/260 |
| 4,701,862 A | 10/1987 | Washizuka et al. ......... 704/274 |
| 4,809,246 A | 2/1989 | Jeng ............................. 434/317 |
| 4,829,580 A | 5/1989 | Church ........................ 704/260 |
| 5,007,838 A | 4/1991 | Cochran ...................... 434/178 |
| 5,031,113 A | 7/1991 | Hollerbauer ................. 704/235 |
| 5,033,966 A | 7/1991 | Behunin ...................... 434/179 |
| 5,046,004 A | 9/1991 | Tsumura et al. .............. 84/601 |
| 5,061,185 A | 10/1991 | Cochran et al. ............. 434/178 |
| 5,083,924 A | 1/1992 | Cochran et al. ............. 434/178 |
| 5,119,474 A | 6/1992 | Beitel et al. ................. 345/302 |
| 5,157,214 A | 10/1992 | Nakanishi et al. ............ 84/622 |
| 5,164,900 A | 11/1992 | Bernath ....................... 707/535 |
| 5,175,803 A | 12/1992 | Yeh ............................. 707/535 |
| 5,209,665 A | 5/1993 | Billings et al. .............. 434/169 |
| 5,212,551 A | 5/1993 | Conanan ..................... 348/484 |
| 5,227,574 A | 7/1993 | Mukaino ...................... 84/652 |

(List continued on next page.)

*Primary Examiner*—Richemond Dorvil
*Assistant Examiner*—Susan McFadden
(74) *Attorney, Agent, or Firm*—Irwin Ostroff

(57) ABSTRACT

A system includes a microprocessor and first and second memories. The microprocessor is programmed to receive a text stream of words and to compare the words received with key words stored in the first memory. The second memory stores data representing musical sounds with one or more of the sounds being associated with a key word stored in the first memory. If there is a match between a word received by the microprocessor and a key word stored in the first memory, an electrical signal representing the corresponding sound stored in the second memory is provided to the microprocessor which then sends same to a speaker or to a display device such as a computer monitor. In one embodiment the data representing the received words is converted into an analog electrical speech signal which is sent to the speaker. The text stream can be generated by a person speaking or from a computer disk which contains words in digital format. If the text stream is generated by a person, then a microphone receives the voice signal and converts same into an electrical signal which is converted from analog to digital form by an analog-to-digital converter which has an output connected to an input of the microprocessor.

34 Claims, 6 Drawing Sheets

U.S. PATENT DOCUMENTS

| | | | |
|---|---|---|---|
| 5,257,314 A | 10/1993 | Kimura | 704/251 |
| 5,321,200 A | 6/1994 | Yamamoto | 434/307 |
| 5,410,097 A | 4/1995 | Kato et al. | 84/610 |
| 5,420,974 A | 5/1995 | Morris et al. | 707/515 |
| 5,429,023 A | 7/1995 | Imaizumi | 84/612 |
| 5,453,570 A | 9/1995 | Umeda et al. | 84/636 |
| 5,465,240 A | 11/1995 | Mankovitz | 369/1 |
| 5,490,234 A | 2/1996 | Narayan | 704/260 |
| 5,499,922 A | 3/1996 | Umeda et al. | 434/307 |
| 5,511,980 A | 4/1996 | Wood | 434/169 |
| 5,521,323 A | 5/1996 | Paulson et al. | 84/610 |
| 5,538,430 A | 7/1996 | Smith et al. | 434/178 |
| 5,553,864 A * | 9/1996 | Sitrick | 463/31 |
| 5,596,695 A | 1/1997 | Hamada et al. | 345/333 |
| 5,615,300 A | 3/1997 | Hara et al. | 704/260 |
| 5,619,003 A | 4/1997 | Hotz | 84/615 |
| 5,621,641 A | 4/1997 | Freeman | 707/534 |
| 5,640,590 A | 6/1997 | Luther | 345/302 |
| 5,642,466 A | 6/1997 | Narayan | 704/260 |
| 5,645,432 A | 7/1997 | Jessop | 434/322 |
| 5,651,678 A | 7/1997 | Phillips | 434/170 |
| 5,695,345 A | 12/1997 | Weiner et al. | 434/317 |
| 5,704,017 A | 12/1997 | Heckerman et al. | 706/12 |
| 5,717,827 A | 2/1998 | Narayan | 704/260 |
| 5,726,373 A | 3/1998 | Choi et al. | 84/609 |
| 5,745,715 A | 4/1998 | Pickover et al. | 345/348 |
| 5,771,276 A | 6/1998 | Wolf | 379/88.16 |
| 5,792,972 A | 8/1998 | Houston | 84/645 |
| 5,795,213 A | 8/1998 | Goodwin | 446/297 |
| 5,799,267 A | 8/1998 | Siegel | 704/1 |
| 5,803,748 A | 9/1998 | Maddrell et al. | 434/317 |
| 5,820,379 A | 10/1998 | Hall | 434/178 |
| 5,830,065 A * | 11/1998 | Sitrick | 463/31 |
| 6,115,482 A * | 9/2000 | Sears et al. | 382/114 |
| 6,119,086 A * | 9/2000 | Ittycheriah et al. | 704/267 |
| 6,154,757 A * | 11/2000 | Krause et al. | 707/530 |
| 6,157,913 A * | 12/2000 | Bernstein | 704/275 |
| 6,172,675 B1 * | 1/2001 | Ahmad et al. | 345/328 |
| 6,188,986 B1 * | 2/2001 | Matulich et al. | 704/275 |
| 6,243,740 B1 * | 6/2001 | Minneman et al. | 709/206 |
| 6,289,165 B1 * | 9/2001 | Abecassis | 386/46 |
| 6,289,312 B1 * | 9/2001 | Raman | 704/270 |

\* cited by examiner

- 0- {Main Theme}
- 1- {Krock's theme}
- 2- {Shlock's Theme}
- 3- {Space travel Theme}
- 4- {Space Danger theme}
- 5- {Combat theme}
- 6- {Humor Theme}
- 7- {Evil theme}
- 8- {Peace theme}

- 0- {Waves}
- 1- {Ocean}
- 2- {Beach}
- 3- {wind}
- 4- {crab scuttle}
- 5- {thunder}
- 6- {splashing}
- 7- {loud splashing}
- 8- {seagull}

| | |
|---|---|
| fight; | 5 |
| klinkon; | 7 |
| peace; | 8 |
| quiet; | 8 |
| shlock; | 2 |
| krock; | 1 |
| captain; | 1 |
| laugh; | 6 |
| laughing; | 6 |
| laughter; | 6 |
| fire; | 5 |
| torpedo; | 5 |
| faser; | 5 |
| locked; | 5 |

15    82

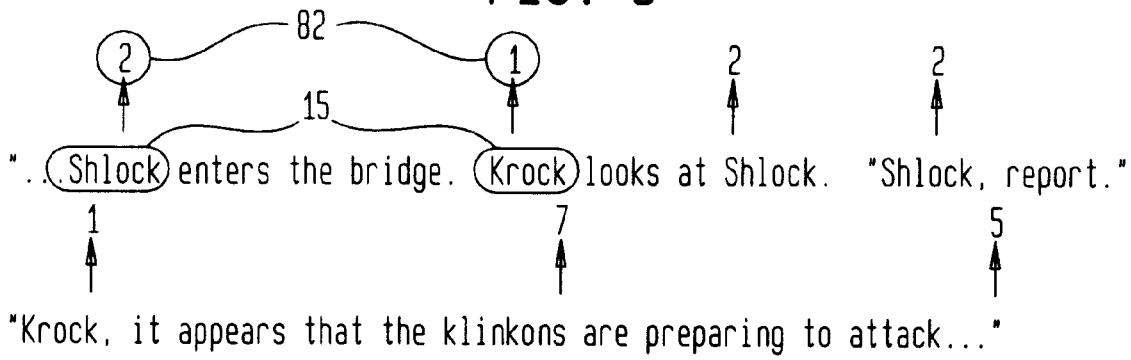

SYSTEM AND METHOD OF PROVIDING EMOTIVE BACKGROUND SOUND TO TEXT

This application claims benefit of Provisional application Ser. No. 60/132,572 filed May 5, 1999.

FIELD OF THE INVENTION

The present invention relates to apparatus and methods for adding emotive background sound to a text sequence which can be derived from speech or text containing words in a digital data file or in a data stream.

BACKGROUND OF THE INVENTION

During reading of text or listening to a conversation, it can be pleasurable to listen to a background sound such as music or environment sounds such as sounds heard at a beach or in a forest. Background sound should match the emotive content of the text read or speech heard.

It is well known to convert text to speech. U.S. Pat. No. 4,429,182 discloses a numeric calculator that generates synthetic speech as numbers are entered and displays entered data. U.S. Pat. No. 4,701,862 discloses an alarm system having speech output in response to digitized time signals. The clock will display a given time with an associated audio recording. U.S. Pat. No. 4,829,580 discloses alpha-numeric character data are used to create sound output based on look-up tables. The tables modify phonic data to assign pause, stress, duration, pitch and intensity to create improved synthetic speech. Intoned speech from text is not an emotive background sound.

Music can be comprised of a melody and lyrics. The melody provides an emotive background for the words of the lyrics. The melody, which is a sound pattern, and the lyrics, which can be tonal (sung) lyrics or atonal speech (rap) paced by the melody, can be stored as a combined digital record. The digital record links the text to the sound sequence. The lyrics associated with the music are chosen by an author to match the melody in a specific sequence. Music can be re-pitched or the pace changed, however the coupling between the lyrics and melody is fixed by an author.

Music can be stored digitally in such formats as the Level 1 General MIDI. In the MIDI format, musical data is digitally represented as multiple sound tracks, each track capable of voicing an assigned instrument. In addition, music in a MIDI file can be modified with parameters such as expression, sustain and pitch bend. U.S. Pat. No. 5,792,972 discloses user control during the playback of a MIDI file. Voices and pitch can be changed in response to user input. Pacing between the words and melody must be maintained when playing music.

Combinations of text and music are used in karaoke systems. Music is generated from a source and images are displayed in response to the music. In association with the music, the text of the lyrics is displayed in association with the progress of the melody so that a singer can read the words associated with the music. U.S. Pat. No. 5,410,097 discloses apparatus playing music and text and having control means to move between passages of multimedia segments. Presentation of text and melody is fixed by the author. The system always maintains an association between words and melody.

Hypermedia consists of coupled data files that can incorporate still images, video images, text and music. A hypermedia file can consist of a set of text including "metadata" that associates other digital data with the text. Metadata can include parameters describing attributes of display of characters, such as "bold", "underline", etc. Metadata can also incorporate vectors associating audio, text and/or video records. The association between various medias must be created by an author. U.S. Pat. No. 5,596,695 discloses a plurality of data types that are coupled together as metadata. Prior art in the field of hypermedia does not disclose methods of generating an emotive background sound from a text.

Prior art discloses books with touch or pointer responsive noise generation associated with portions of text. The noises can have emotive content. U.S. Pat. No. 5,645,432 discloses a book having touch-activated areas for generating sound within the body of text. U.S. Pat. No. 3,724,100 discloses such a book having text, and a positional transducer for producing sound recorded on a page associated with said text. An author is required to generate an association between the sound and text. A reader must manually queue the associated sound environment. It would be useful to have an emotive background sound generated automatically in response to key words in the text.

Apparatus has been disclosed that generates an acoustic background while reading text to improve reading. U.S. Pat. No. 5,033,966 provides a cyclic stereophonic sound pattern that is heard while reading text. The side-to-side change in apparent sound direction encourages a rapid sweeping of eye focus during text reading. The background is not responsive to the emotive content of the text. U.S. Pat. No. 5,061,185 delivers audio signals to each ear, a first audio signal having subliminal messages and an audio signal exclusive of the subliminal messages. The background is not coupled to the textual semantic or emotive content.

Prior art discloses means for displaying combinations of text, images and sound. Presentation of text and images is paced by a melody. Hypertext structures require user interaction to initiate processing of media files. Other means have been disclosed which require a user to selectively trigger media events that can incorporate video, audio, still image and text presentation. Crafting interactions between the various media structures has been done manually by an author. It would be advantageous for a person to be reading or hearing words and have an emotive background sound automatically playing in response to key words in the text at a user selected pace. It would be advantageous for such responsive background sounds to occur when reading or speaking or coupled with transmitted speech.

Music is a pre-scripted coupling of non-vocal sound and lyrics. The separate elements must be pre-scripted by an author. There is no way to decouple the music from a word stream. Simply playing music or an environmental recording while reading or listening to speech provides environmental sound, however, the environmental sound is not responsive to the emotive content of the text.

It would be advantageous to have an emotive background sound provided with key words in a text.

SUMMARY OF THE INVENTION

The present invention is directed to a system for providing emotive background sound to a given text comprising a source of text that is to be provided with an emotive background and that includes key words that serve to indicate the background that is appropriate, a store of such keys words including parameters to provide an emotive background sound appropriate to the key words; and a process to recognize key words within said text using said store to provide an emotive background sound appropriate to key words. The emotive background environment is generated from text that can be displayed on a monitor or from spoken text.

Viewed from a first apparatus aspect, the present invention is directed to apparatus comprising memory apparatus and a processor. The memory apparatus has stored therein key words and/or key nontextual indicia and emotive sounds. Each key word and/or nontextual indicia is associated with one of the emotive sounds. The processor is to detect words and nontextual indicia received thereby and to compare the received words and nontextual indicia to key words and nontextual indicia stored in the memory. The processor is adapted to generate an output signal representing an emotive sound associated with a key word and/or key nontextual indicia if there is a match with a received word and/or nontextual indicia.

Viewed from a second apparatus aspect, the present invention is directed to a system for providing an emotive background sound to a text that includes key words and/or key nontextual indicia. The system comprises first and second memories, and a microprocessor. The first memory has stored therein key words and/or key nontextual indicia. The second memory has stored therein emotive sounds with each key word and each key nontextual indicia having associated therewith an emotive sound. The microprocessor is in communication with the memories and being adapted to compare received words and nontextual indicia of the text with the key words and key nontextual indicia stored in the first memory, and if there is a match between one of more key words and the key nontextual indicia, to generate at an output thereof a signal representative of the emotive sound associated with the matched key word or nontextual indicia.

Viewed from a third apparatus aspect, the present invention is directed to a system for providing an emotive background sound to a text that includes key words and/or nontextual indicia. The system comprises means for recognizing words and/or nontextual indicia in the text, a first file containing key words and key nontextual indicia, a second file containing emotive sounds with an emotive sound being associated with a key word and/or key nontextual indicia, and means for comparing the words and/or nontextual indicia with those contained in the first file, and if there is found to be a match, for causing an emotive sound to be generated which corresponds to the matched key word and/or key nontextual indicia.

Viewed from a fourth apparatus aspect, the present invention is directed to a system for providing an emotive background sound to a text that includes key words and/or key nontextual indicia. The system comprises a processor system that includes a processor, first and second memory sections, and sound generating circuitry. The first memory section stores key words and key nontextual indicia. The second memory stores emotive sounds with each emotive sound corresponding to a key word or key nontextual indicia stored in the first memory section. The processor is adapted to sense words and nontextual indicia in the text and to compare same to the key words and the key nontextual indicia stored in the first memory section and to cause the sound generating circuitry to generate an emotive sound if there is a match of a key word and/or key non-text indicia of the text with one in the first memory.

Viewed from a fifth apparatus aspect, the present invention is directed to a system for providing an emotive background sound to a text that includes key words and/or key nontextual indicia. The system comprises a store of key words and key nontextual indicia, and a store of background sounds that is controlled by the key words or key nontextual indicia whereby as key words and/or nontextual indicia of the text are recognized. The store of background sounds provides an emotive background sound appropriate to the key word or nontextual indicia.

Viewed from a sixth apparatus aspect, the present invention is directed to a system which generates a background emotive sound in response to speech which contains words and sounds. The system comprises a microphone, an analog-to-digital converter; a microprocessor in communication with the analog-to-digital converter; a first memory having stored therein key words and key sounds; and a second memory having stored therein emotive sounds with each key word and each key sound having associated therewith an emotive sound. The microphone is adapted to be in communication with the speech and generates an analog electrical representative of the speech in communication therewith. The analog-to-digital converter is in communication with the microphone and converts an electrical signal representative of speech in communication with the microphone into a digital format. The microprocessor is in communication with the analog-to-digital converter. The microprocessor is in communication with the memories and is adapted to compare received words and sounds of the speech with the key words and key sounds stored in the first memory, and if there is a match between one or more of the key words and/or the key sounds, to generate at an output thereof a signal representative of the emotive sound associated with the matched key word or key sound.

Viewed from a seventh apparatus aspect, the present invention is directed to a system which, in response to digitized words and sounds, generates speech and a background emotive sound. The system comprises first and second microprocessors, a first memory having stored therein key words and key sounds, a second memory having stored therein emotive sounds with each key word and each key sound having associated therewith an emotive sound, first and second sound drivers, and a speaker. The first microprocessor is adapted to receive the digitized words and sounds and in communication with the memories and being adapted to compare the digitized words and sounds with the key words and key sounds stored in the first memory, and if there is a match between one or more of the key words and/or the key sounds, to generate at an output thereof a signal representative of the emotive sound associated with the matched key word or key sound. The second microprocessor is adapted to receive the digitized words and sounds and to generate at an output thereof a signal representative of the words and sounds. The first sound driver is in communication with the first microprocessor. The second sound driver is in communication with the second microprocessor. The sound mixer is in communication with the first and second sound drivers. The speaker is communication with the sound mixer.

Viewed from an eighth apparatus aspect, the present invention is directed to an emotive dictionary useful for providing emotive background sound to either a text in digitized form or speech comprising a memory having stored therein key words and/or equivalent and associated data corresponding to an emotive sound.

Viewed from a ninth process aspect, the present invention is directed to a method of providing an emotive background sound to a given text which includes at least one key word and/or key nontextual indicia. The method comprises the steps of: providing a source of key words and/or key nontextual indicia with an emotive sound appropriate to each key word or key nontextual indicia being associated with each key word or nontextual indicia; sensing the text to determine if a key word or key nontextual indicia is present therein; and generating an emotive sound associated with a key word and/or key nontextual indicia found in the text.

Viewed from a tenth process aspect, the present invention is directed to a method of providing an emotive background sound to speech which includes at least one key word and/or key sound. The method comprises the steps of: sensing the words and sounds contained within the speech; comparing the words and sounds contained within the speech to key words and key sounds stored within a file with each key word or key sound contained within the file having an emotive sound appropriate thereto associated therewith; and generating an emotive sound appropriate to a key word and/or key sound found within the speech such that the emotive sound occurs during the speech.

Viewed from an eleventh process aspect, the present invention is directed to a method of providing an emotive background sound to a given text which includes at least one key word and/or key nontextual indicia. The method comprises the steps of: providing a source of key words and/or key nontextual indicia with an emotive sound appropriate to each key word or key nontextual indicia being associated with each key word or nontextual indicia; sensing the text to determine if a key word or key nontextual indicia is present therein; and generating a file containing said text and emotive sound parameters associated with a key word and/or key nontextual indicia found in the text.

The invention will be more readily understood from the following detailed description taken with the accompanying drawings and claims.

BRIEF DESCRIPTION OF THE DRAWINGS

FIG. 7A shows a first sound environment useful with the embodiments of FIGS. 1, 2, 3, and 6;

FIG. 7B shows a second sound environment useful with the embodiments of FIGS. 1, 2, 3, and 6;

FIG. 8 shows an emotive dictionary useful with the embodiments of FIGS. 1, 2, 3, 5, and 6;

FIG. 9 shows a text passage showing sound environment modifiers generated from text in accordance with the present invention;

FIG. 10 shows the same text passage as is shown in FIG. 9 with embedded sound environment modifiers.

DETAILED DESCRIPTION

Figure 1:
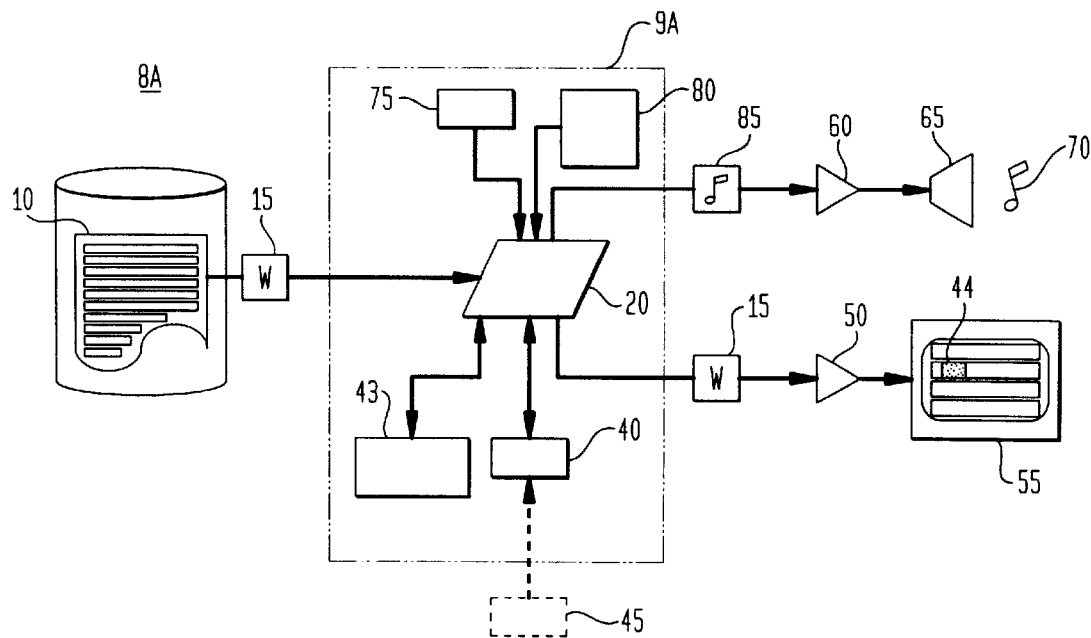
FIG. 1 shows a system in accordance with a first embodiment of the present invention.

Referring now to FIG. 1, there is shown a system (apparatus) 8A in accordance with a first embodiment of the present invention. System 8A generates an emotive background sound 70 (illustrated as musical note) based on the emotive content of text contained in a file 10 that comprises a plurality of words 15 that are stored as digital data. File 10 can, for example, be part of an electronic book, a magnetic disk., or other type of medium capable of storing a file. Alternatively, file 10 can be a transmitted data file.

System 8A comprises a computer system 9A, a sound driver 60, a speaker 65, a display driver (means for converting) 50, a display (computer monitor) 55, and optionally a reading position control 45 (shown as a dashed line rectangle). Computer system 9A comprises a processor (microprocessor, means for recognizing and comparing) 20, a sound environment file (memory apparatus, a memory, a memory section, a store) 75, an emotive dictionary file (memory apparatus, a memory, a memory section, a store) 80, and a pointer memory storage file 40. An optional position control 45 (shown in dashed lines) has an output which is coupled to computer system 8A which receives input to pointer memory storage file 40. On display 55 is shown a position pointer 44 that can be generated from pointer memory 40 that is regularly updated to locate position pointer 44 on display 55. Position controller 45 can be keys on a keyboard, a hand manipulated controller, or a touch screen over display 55. Computer system 9A can be a personal computer having programing which facilitates the present invention. Emotive dictionary file 80 and sound environment file 75 are data files accessed by processor 20.

Emotive dictionary 80 stores a set of key words, each key word having one or more modifying or selecting parameters that represents the emotive content for a key word or group of key words. Sound parameters can be data representing "fast" or "slow", "loud" or "quiet", "high", or "low" that can correspond to the musical values of tempo, volume, or pitch. Emotive dictionary 80 does not need a complete set of words; only key words having emotive content and parameters changing the emotive background sound based on the emotive content of one or more key words. Alternatively, key words of words 15 can have associated data that selects a portion of music or sound from sound environment file 75 that reflects the emotive content of a key word 15. The selected sound environment 85 is a set of digital data, shown as a block with a musical note, that is sent to sound driver 60 to generate drive signals to speaker 65 and emit a text responsive emotive sound 70.

Processor 20 can access file 10 and receives words 15 (shown as boxes each having a "w" contained therein) from file 10. Processor 20 receives words 15 and can send same to an input of display driver 50. Display driver 50 has an output coupled to an input of display 55. It generates a video display of the words 15 received at an output which are visually displayed on display 55, which is typically a computer monitor. Processor 20 also compares words 15 with words stored in emotive dictionary 80. If there is a match between a word 15 and a word stored in emotive dictionary 80, then processor 20 selects a set of corresponding sound generation parameters from the environment file 75 which corresponds to the matched word and via a second output thereof generates a music or sound environmental 85 sent to sound driver 60. Sound driver 60 can be a conventional sound card, for example, Creative Labs Soundblaster series of sound cards. Sound driver 60 delivers an electrical signal to speaker 65 which then emits a background sound 70 which is indicated by the musical note shown. Speaker 65 can be a set of headphones.

Processor 20 can keep a history file 43 of words 15 that have been recently processed. A list of key words 15 is generated of key words 15 that have been processed for a given time, such as 15 seconds. The list can further include key words 15 ahead of the an estimated reading position stored in pointer memory file 40. An emotive background sound 70 is generated by computing a composite index based on all of the key words stored in history file 43 to select sound environment 85.

Reading of words 15 is initiated by a reader who sets pointer memory 40 to an initial position within file 10 using reading position control 45. Reading position control 45 is used by the processor to determine a users current reading position. Words at the initial reading position within file 10 are shown on display 55. A user uses reading position control 45 to change effective reading area, such as scrolling text up or down on display 55. As the text changes on display 55, background sound 70 changes in response to the emotive content of the displayed text.

Figure 2:
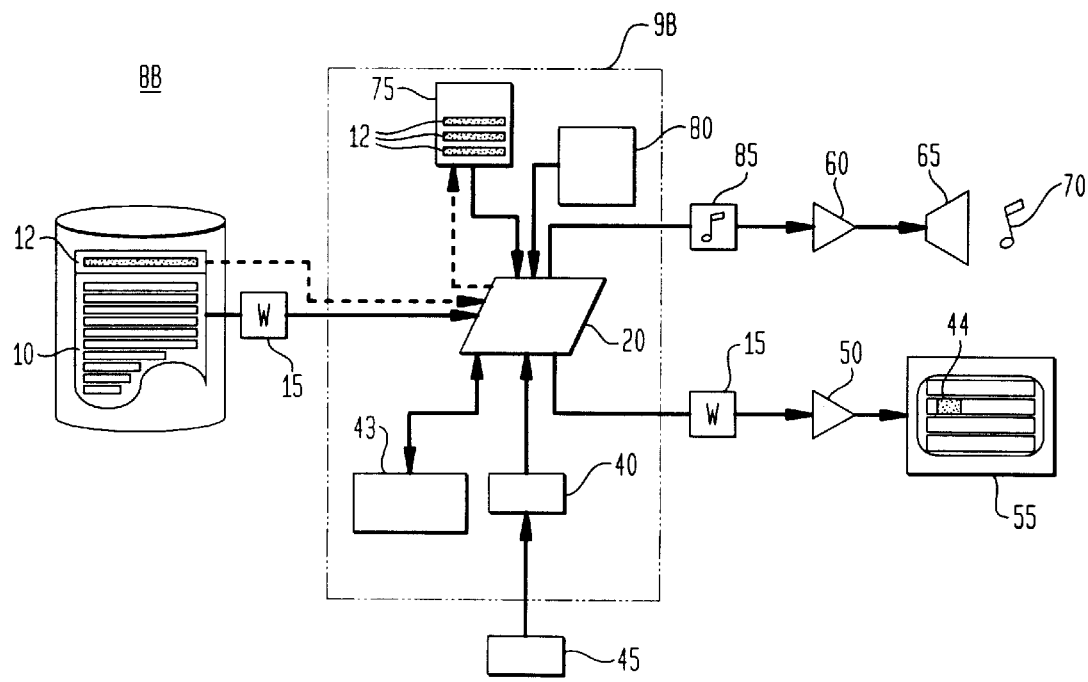
FIG. 2 shows a system in accordance with a second embodiment of the present invention.

Referring now to FIG. 2, there is shown a system 8B in accordance with a second embodiment of the present invention. System 8B is very similar to system 8A of FIG. 1 and reference numbers of similar components are the same. The only differences are that file 10 has additionally an environmental header 12 which can be added to or be stored by processor 20, as all of or part of sound environment file 75. Environmental header 12 adds metadata having a plurality of or modifiable music programs which are added to sound environment file 75 before or during the reading of words 15. Environmental header 12 provides the capacity for a given emotive sound environment to be associated with text in a given file 10. A plurality of environmental headers 12 can be stored in various areas of file 10 to change the data generated for sound environment 85 for different portions of text. A user can select an environment header 12 loaded from file 10 or one of several stored environments headers 12 within sound environment file 75 while reading from file 10.

Figure 3:
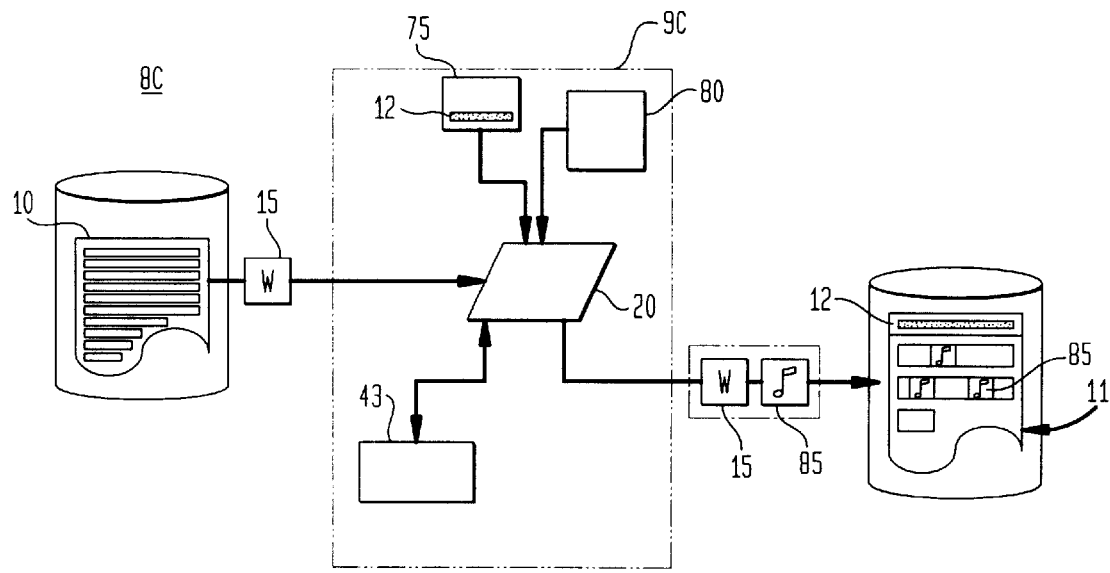
FIG. 3 shows a system in accordance with a third embodiment of the present invention.

Referring now to FIG. 3. there is shown a system 8C in accordance with a third embodiment of the present invention. System 8C functions to read file 10, which can be, for example, part of an electronic book, a magnetic disk, or other type of medium capable of storing a file, and to generate therefrom a file 11 which has an emotive background embedded therein with file 11 also being a medium capable of storing text (words) and an emotive background. Components of FIG. 3 which are similar or essentially identical to those of FIGS. 1 and 2 have been given the same reference number or the same reference number with the same or a different letter following same.

System 8C comprises a computer system 9C, which comprises a processor 20, a sound environment file 75 having at least one environment header 12, and an emotive dictionary file 80. Computer system 9C can be a personal computer having programing which facilitates the present invention. Emotive dictionary file 80 and sound environment file 75 are data files each accessed by processor 20. Words 15 are routed from file 10 to an input of processor 20. Processor 20 acts on words 15 from file 10 to generate an associated sound environment 85. An output of processor 20 generates a file 11 which receives and stores words 15 and data for sound environment (content) 85 and an optional environmental header 12. Thus emotive background sound data has now been generated within file 11.

Figure 4:
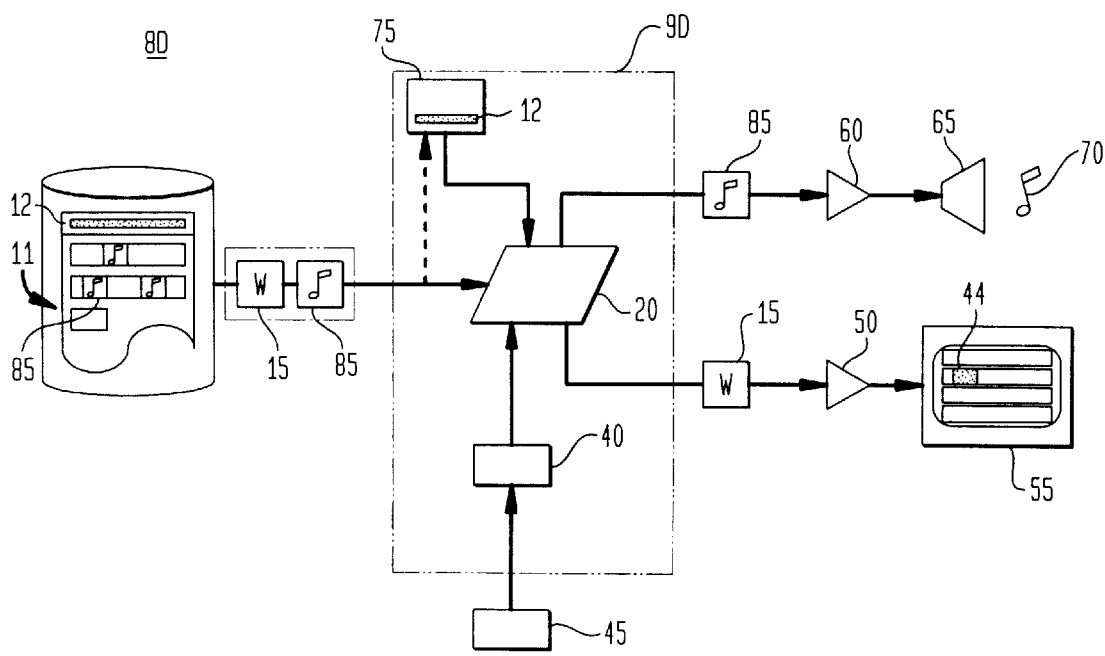
FIG. 4 shows a system in accordance with a fourth embodiment of the present invention.

Referring now to FIG. 4, there is shown a system 8D in accordance with a fourth embodiment of the present invention. System 8D takes the words of file 11 and emotive word-associated sound environment 85 of system 8C and generates therefrom a visual display on a monitor 55 and an emotive background sound 70 from a speaker 65. Components of FIG. 3 which are similar or essentially identical to those of FIGS. 1, 2, and 3 have been given the same reference number or the same reference number with the same or a different letter following same.

Processor 20 reads file 11 and loads the environmental header 12 into sound environment file 75 prior to receiving words 15 from file 11. As sets of words are shown on display 55, processor 20 operates on sound environment 85 associated with displayed key words and uses sound environment 85 to create emotive background sound 70, generating a text responsive emotive background sound based on key words 15. System 8D supplies emotive background sound 70 in response to the value in pointer memory storage file 40.

Figure 5:
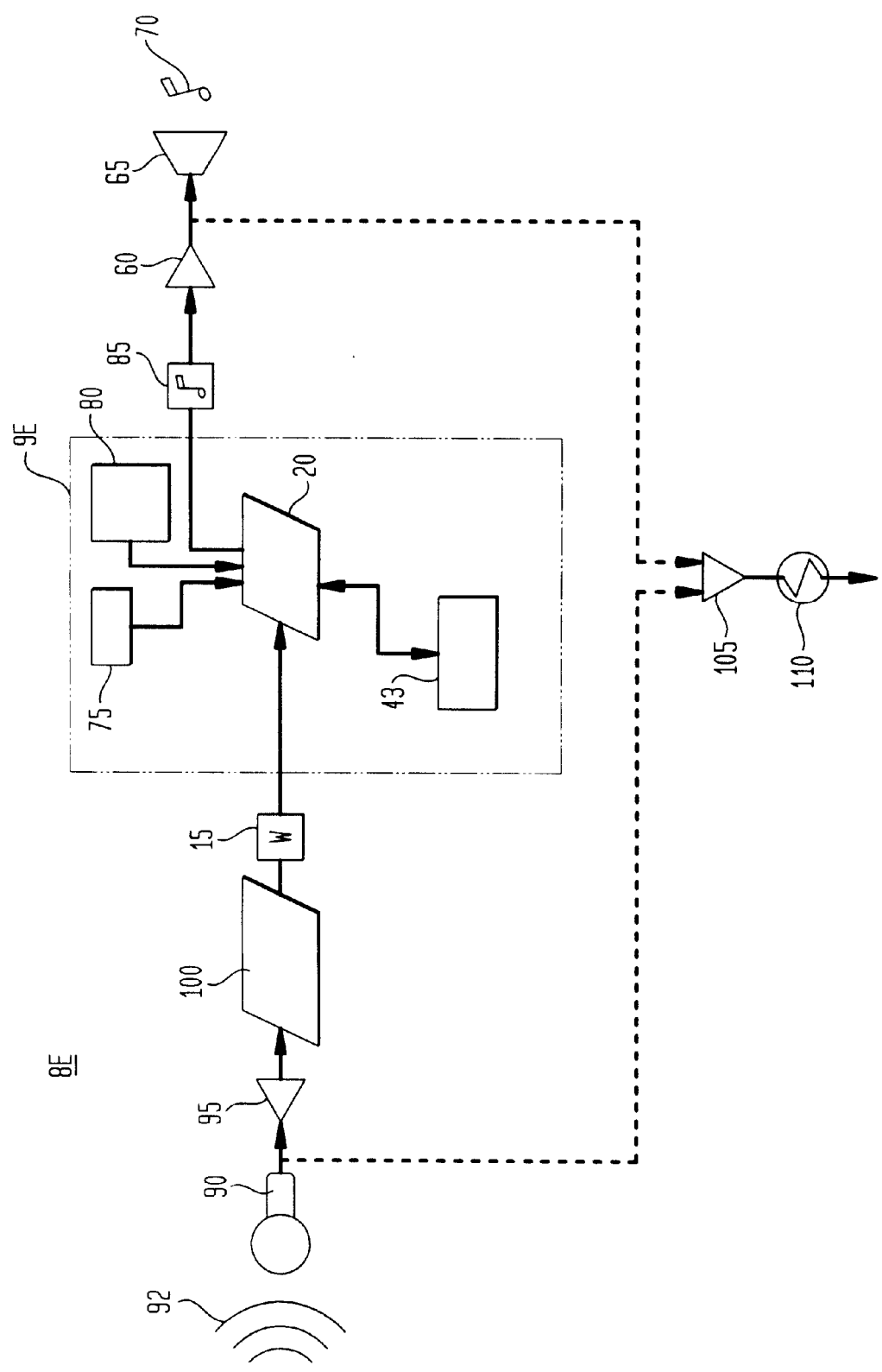
FIG. 5 shows a system in accordance with a fifth embodiment of the present invention.

Referring now to FIG. 5, there is shown a system 8E in accordance with a fifth embodiment of the present invention. System 8E is similar to system 8A of FIG. 1 and reference numbers of similar components are the same. The primary difference between system 8A of FIG. 1 and system 8E of FIG. 5 is that the words 15 are not from a data file 10 as shown in FIG. 1, but are generated by speech 92 which is sensed by a microphone 90. An output of microphone 90 is coupled to an input of analog-to-digital converter 95 whose output is coupled to an input of a speech converter 100 that converts the digitized sound into a sequence of words 15 that are coupled to an input of processor 20. Processor 20 operates on the words 15 in concert with sound environment file 75 and emotive dictionary 80 to provide sound environment 85 to sound drive 60 which provides drive signals to speaker 65 that generates emotive background sound 70. An output of microphone 90 is optionally coupled to a first input of a sound mixer 105 which has a second input optionally coupled to the sound mixer 105. An output of sound mixer 105 is coupled a transmitter 110 which can transmit combined speech and an emotive background sound.

System 8E can be placed in social environments. A plurality of musical themes can be stored as sound environment file 75. Conversation monitored through microphone 90 will have added thereto appropriate sound environments which are selected based on matches of words 15 with key words in emotive dictionary 80. Using sound mixer 105 and transmitter 110 allows for speech to be combined with emotive background sound and transmitted to a location remote from the speaker 65.

Figure 6:
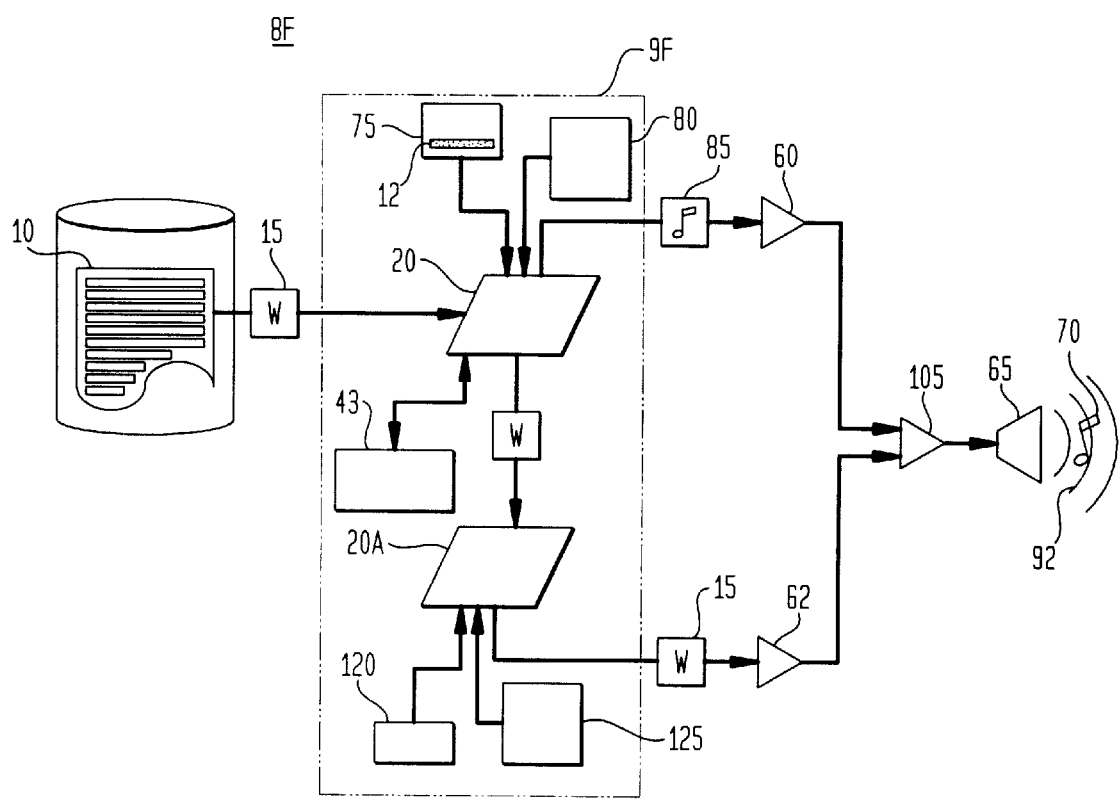
FIG. 6 shows a system in accordance with a sixth embodiment of the present invention.

Referring now to FIG. 6, there is shown a system 8F in accordance with a sixth embodiment of the present invention. System 8F generates an emotive background sound 70 based on the emotive content of words 15 contained in a file 10 and generates speech 92 from the words 15. The emotive background sound 70 is mixed with the speech 92 and is emitted by a speaker 65. File 10 can, for example, be part of an electronic book, a magnetic disk, or other type of medium capable of storing a file.

System 8F contains many of the same components of system 8A of FIG. 1. Components of system 8F which are the same as those of system 8A of FIG. 1 have the same reference numbers. System 8F comprises a computer system 9F, a sound driver 60, a speech driver 62, a sound mixer 105, a speaker 65, and a file 10 which contains words 15. Computer system 9A comprises a first processor 20, a second processor 20A, a sound environment file 75, an emotive dictionary file 80, a grammar library 120, and a phonetic library 125. Words 15 from file 10 are operated on by processors 20 and 20A simultaneously. An emotive background sound 40 is generated in the same essential manner as in system 8A by processor 20, environment file 75, emotive dictionary file 80, driver 60 and speaker 65. Speech 92 is generated by processor 20A, grammar library 120, phonetic library 125, driver 62 and speaker 65. Signals from drivers 60 and 62 are coupled to sound mixer 105 which drives speaker 65.

In one embodiment, file 10 of FIGS. 1, 2, 3, and 6 corresponds to an episode of a science fiction adventure. A science fiction adventure sound environment file 75 is shown in FIG. 7A. Sound environment file 75 stores a plurality of acoustic themes that can be combined to create a specific environment. For each theme there is an emotive identifier 82 and an associated sound element 77. Sound element 77 is a short repeated musical passage on a one or more instruments that is broadcast on an assigned MIDI channels. All sound elements 77 are in a given common musical key and rhythm to prevent acoustic dissonance. Alternatively, sound elements 77 can be a set of sounds associated with a given natural environment. Separate channels are used for each of themes based on sound element 75. The sum of all selected sound elements 77 provides, sound environment 85.

A beach (seashore) sound environment file 75 is shown in FIG. 7B. A correspondence can exist between common emotive identifiers 82 in each file. Referencing FIG. 1, sound environment file 75 can initially hold the "beach" environment shown in FIG. 7B. A user requests that processor 20 display a portion of file 10. File 10 includes the science fiction adventure environment header 12 shown in FIG. 7A, which is loaded into sound environment file 75. An initial theme, 0, can be played from speaker 65. As a user displays different portions of text, key words can trigger various musical themes stored in the science fiction emotive environment. Alternatively, a reader may select the seashore environment from sound environment file 75 for the same text.

FIG. 8 represents an emotive dictionary 80 of systems 8A, 8B, 8D, 8E, and 8F of FIGS. 1, 2, 4, 5, and 6, respectively. Emotive dictionary 80 contains a list of key words 15, and associated emotive identifiers 82 characterizing a the emotive content of a key word 15. For example, key word "fight" is associated with emotive identifier "5"; key word "shlock" is associated with emotive identifier "2"; and key word "captain" is associated with emotive identifier "1". Processor 20 reads words 15 from file 10 and searches for a word match from emotive dictionary 80. Matches for a given key word 15 permit selection of emotive identifiers 82 for a portion of displayed text. Each emotive identifier 82 is used by processor 20 to select a sound element 77 of sound environment file 75 to be played for a displayed key word.

In another embodiment, emotive dictionary 80 can be combined with sound environment 75. Emotive identifiers 82 are eliminated, and sound elements 77 are stored within emotive dictionary 80 and associated with key words 15. If words 15 in the text match key words 15 in the emotive dictionary 80, sound element 77 in emotive dictionary 80 is used to generate sound environment 85 directly. Combining sound environment 75 with emotive dictionary 80 eliminates the capability of having a plurality of different types of sound environments 85 for a given passage, as well as eliminating the capability of having a different emotive dictionaries 80 operating on a given emotive environment 75.

FIG. 9 shows a passage from the science fiction adventure. Those words 15 which are key words match entries in emotive dictionary 80. When word 15 of a file 10 (see FIGS. 1, 2, 3, and 6) is a key word, processor 20 retrieves the associated emotive identifier 82 from emotive dictionary 80. Emotive identifiers 82 for the displayed portion of text are used to select sound elements 77, in conjunction with other sound elements from text history 43 to provide a sound environment 85. A user can select an alternative environment, such as the original "seashore" environment for the same text. Each sound environment file 75 should have common parameters such as pitch and tempo or natural environment to optimize harmonization of musical and thematic expression in emotive sound environment 70. Sound environment 70 does not drive the reading process, but responds to key words in text on display 55 that are associated with a person's reading position or current spoken word.

FIG. 10 shows the same text in FIG. 9 with emotive identifiers 82 having been embedded within the text of file 10 (to result in file 11) in association with key words 15 by the system 8C of FIG. 3. System 8D of FIG. 4 operates on file 11 (a metadata file) to create an emotive background sound 70 in response to displaying word portions of file 11. Embedding sound modifying parameters in file 10 requires emotive dictionary 80 to embed the metadata; however, emotive dictionary 80 is not needed to generate an emotive sound environment in FIG. 4. In system 8D of FIG. 4, processor 20 must have the capacity to respond to the sound environment 85 associated with displayed text at a reader's pace to generate an emotive sound background 70. Emotive identifiers 82 are not shown on display 55 and can operate on one of several sound environments in sound environment file 75.

The invention has been described in detail with particular reference to certain preferred embodiments thereof, but it will be understood that variations and modifications can be effected within the spirit and scope of the invention.

What is claimed is:

1. Apparatus comprising:
   memory apparatus having stored therein key words and/or key nontextual indicia and emotive sounds, each key word and/or nontextual indicia being associated with one of the emotive sounds; and
   a processor being programmed to detect words and nontextual indicia received thereby and to compare the received words and nontextual indicia to key words and nontextual indicia stored in the memory, the processor being adapted to generate an output signal representing an emotive sound associated with a key word and/or key nontextual indicia if there is a match with a received word and/or nontextual indicia.

2. The apparatus of claim 1 further comprising means for converting the processor generated output signal to an audio signal.

3. The apparatus of claim 2 wherein the converting means is an audio driver.

4. The apparatus of claim 3 further comprising a speaker coupled to an output of the audio driver.

5. The apparatus of claim 1 wherein the words and nontextual indicia are in digitized form and the system further comprises means for causing the words and nontextual indicia to converted to an audio format which can be heard with the generated emotive background sound.

6. The apparatus of claim 1 wherein the words and nontextual indicia are in digitized form and the system further comprises means for displaying the words and nontextual indicia on a display device while the emotive sound is being generated.

7. The apparatus of claim 6 wherein the display is a computer monitor.

8. The apparatus of claim 1 wherein the words and nontextual indicia are speech.

9. The apparatus of claim 1 wherein the processor and memory are part of a computer system.

10. The system of claim 1 wherein the text is in digitized form and the system further comprises means for causing the words and nontextual indicia to converted to an audio format which can be heard with the generated emotive background sound.

11. The system of claim 1 wherein the text is in digitized form and the system further comprises means for displaying the words and nontextual indicia on a computer monitor while the emotive sound is being generated.

12. The system of claim 11, wherein the display is a computer monitor.

13. The system of claim 1 wherein the text is in digitized form and the output signal from the microprocessor contains the emotive sound in digitized form as well as the text in digitized form.

14. A system for providing an emotive background sound to a text that includes key words and/or key nontextual indicia, the system comprising:
- a first memory having stored therein key words and/or key nontextual indicia;
- a second memory having stored therein emotive sounds with each key word and each key nontextual indicia having associated therewith an emotive sound; and
- a microprocessor being in communication with the memories and being adapted to compare received words and nontextual indicia of the text with the key words and key nontextual indicia stored in the first memory, and if there is a match between one of more key words and the key nontextual indicia, to generate at an output thereof a signal representative of the emotive sound associated with the matched key word or nontextual indicia.

15. The system of claim 14, further comprising means for converting the processor generated output signal to an audio signal.

16. The apparatus of claim 15, wherein the converting means is a an audio driver.

17. The apparatus of claim 16, further comprising a speaker coupled to an output of the audio driver.

18. The system of claim 14 wherein the microprocessor and first and second memories are part of a computer system.

19. The system of claim 14 wherein the text is speech.

20. A system for providing an emotive background sound to a text that includes key words and/or nontextual indicia, the system comprising:
- means for recognizing words and/or nontextual indicia in the text;
- a first file containing key words and key nontextual indicia;
- a second file containing emotive sounds with an emotive sound being associated with a key word and/or key nontextual indicia; and
- means for comparing the words and/or nontextual indicia with those contained in the first file, and if there is found to be a match, for causing an emotive sound to be generated which corresponds to the matched key word and/or key nontextual indicia.

21. The system of claim 20 further comprising means for causing the text to be presented on a display device while the emotive sound is being generated.

22. The system of claim 20 further comprising means for causing the words and nontextual indicia of the text to be generated as voice sounds.

23. A system for providing an emotive background sound to a text that includes key words and/or key nontextual indicia, the system comprising:
- a processor system that includes a processor, first and second memory sections, and sound generating circuitry;
- the first memory section storing key words and key nontextual indicia;
- the second memory storing emotive sounds with each emotive sound corresponding to a key word or key nontextual indicia stored in the first memory section;
- the processor being adapted to detect words and nontextual indicia in the text and to compare same to the key words and the key nontextual indicia stored in the first memory section and to cause the sound generating circuitry to generate an emotive sound if there is a match of a key word and/or key non-text indicia of the text with one in the first memory.

24. A system for providing an emotive background sound to a text that includes key words and/or key nontextual indicia, the system comprising:
- a store of key words and key nontextual indicia; and
- a store of background sounds that is controlled by the key words or key nontextual indicia whereby as key words and/or nontextual indicia of the text are recognized, the store of background sounds provides an emotive background sound appropriate to the key word or nontextual indicia.

25. A system which generates a background emotive sound in response to speech which contains words and sounds, said system comprising:
- a microphone which is adapted to be in communication with the speech and which generates an analog electrical representative of the speech in communication therewith;
- an analog-to-digital converter in communication with the microphone and which converts an electrical signal representative of speech in communication with the microphone into a digital format;
- a microprocessor in communication with the analog-to-digital converter;
- a first memory having stored therein key words and key sounds;
- a second memory having stored therein emotive sounds with each key word and each key sound having associated therewith an emotive sound; and
- the microprocessor being in communication with the memories and being adapted to compare received words and sounds of the speech with the key words and key sounds stored in the first memory, and if there is a match between one or more of the key words and/or the key sounds, to generate at an output thereof a signal representative of the emotive sound associated with the matched key word or key sound.

26. The system of claim 25 further comprising a speaker coupled to the output of the microprocessor, said speaker generating an emotive sound which serves a back ground to the speech.

27. The system of claim 25 further comprising a mixer circuit in communication with the microphone and the microprocessor for mixing together the speech and the generated emotive sound.

28. The system of claim 27 further comprising a speaker located at a remote location to the speech and being in communication with the mixer circuit such that the speech and emotive background sound can be heard at the remote location.

29. A system which, in response to digitized words and sounds, generates speech and a background emotive sound, said system comprising:
- first and second microprocessors;
- a first memory having stored therein key words and key sounds;

a second memory having stored therein emotive sounds with each key word and each key sound having associated therewith an emotive sound; and the first microprocessor being adapted to receive the digitized words and sounds and in communication with the memories and being adapted to compare the digitized words and sounds with the key words and key sounds stored in the first memory, and if there is a match between one or more of the key words and/or the key sounds, to generate at an output thereof a signal representative of the emotive sound associated with the matched key word or key sound;

the second microprocessor being adapted to receive the digitized words and sounds and to generate at an output thereof a signal representative of the words and sounds;

first and second sound drivers;

the first sound driver being in communication with the first microprocessor;

the second sound driver being in communication with the second microprocessor;

a sound mixer being in communication with the first and second sound drivers; and a speaker being in communication with the sound mixer.

30. The system of claim 29 further comprising:

a third memory having stored therein a grammar library and being in communication with the second microprocessor; and a fourth memory having stored therein a phonetic library and being in communication with the second microprocessor.

31. An emotive dictionary useful for providing emotive background sound to either a text in digitized form or speech comprising a memory having stored therein key words and/or equivalent and associated data corresponding to an emotive sound.

32. A method of providing an emotive background sound to a given text which includes at least one key word and/or key nontextual indicia comprising the steps of:

providing a source of key words and/or key nontextual indicia with an emotive sound appropriate to each key word or key nontextual indicia being associated with each key word or nontextual indicia;

sensing the text to determine if a key word or key nontextual indicia is present therein; and generating an emotive sound associated with a key word and/or key nontextual indicia found in the text.

33. A method of providing an emotive background sound to speech which includes at least one key word and/or key sound comprising the steps of:

sensing the words and sounds contained within the speech;

comparing the words and sounds contained within the speech to key words and key sounds stored within a file with each key word or key sound contained within the file having an emotive sound appropriate thereto associated therewith; and generating an emotive sound appropriate to a key word and/or key sound found within the speech such that the emotive sound occurs during the speech.

34. A method of providing an emotive background sound to a given text which includes at least one key word and/or key nontextual indicia comprising the steps of:

providing a source of key words and/or key nontextual indicia with an emotive sound appropriate to each key word or key nontextual indicia being associated with each key word or nontextual indicia;

sensing the text to determine if a key word or key nontextual indicia is present therein; and generating a file containing said text and emotive sound parameters associated with a key word and/or key nontextual indicia found in the text.

* * * * *